(12) United States Patent
Cliquet

(10) Patent No.: US 6,674,903 B1
(45) Date of Patent: Jan. 6, 2004

(54) METHOD FOR SMOOTHING STAIRCASE EFFECT IN ENLARGED LOW RESOLUTION IMAGES

(75) Inventor: Wim Cliquet, Tremelo (BE)

(73) Assignee: AGFA-Gevaert, Mortsel (BE)

( * ) Notice: Subject to any disclaimer, the term of this patent is extended or adjusted under 35 U.S.C. 154(b) by 0 days.

(21) Appl. No.: 09/407,380

(22) Filed: Sep. 28, 1999

Related U.S. Application Data

(60) Provisional application No. 60/112,650, filed on Dec. 14, 1998.

(30) Foreign Application Priority Data

Oct. 5, 1998 (EP) ............................................. 98203342

(51) Int. Cl.$^7$ ................................................. G06T 5/00

(52) U.S. Cl. ....................................... 382/199; 382/269

(58) Field of Search ................................ 382/269, 268, 382/266, 199, 286; 345/611, 615

(56) References Cited

U.S. PATENT DOCUMENTS

| | | | | |
|---|---|---|---|---|
| 5,050,227 A | * | 9/1991 | Furusawa et al. | 382/54 |
| 6,021,256 A | * | 2/2000 | Ng et al. | 395/109 |
| 6,091,862 A | * | 7/2000 | Okisu | 382/300 |
| 6,259,823 B1 | * | 7/2001 | Lee et al. | 382/268 |

* cited by examiner

*Primary Examiner*—Andrew W. Johns
(74) *Attorney, Agent, or Firm*—Robert A. Sabourin

(57) ABSTRACT

A method in the field of image enhancement is described for smoothing the staircase effect in electronic images. These staircases may be introduced by electronic zooming of an original image having a low spatial resolution or by the application of a lossy compression algorithm, such as JPEG, to the image data. According to one example, for each pixel of the image local gradients are computed according to four directions. A first direction associated with the highest local gradient is selected. In order to smooth the image in a second direction, orthogonal to the first direction, the pixel value is changed according to the values of pixels situated along the second direction in the neighborhood of the pixel. Optionally, the smoothed image data may be subsequently sharpened by a method including the use of gradients.

7 Claims, 1 Drawing Sheet

METHOD FOR SMOOTHING STAIRCASE EFFECT IN ENLARGED LOW RESOLUTION IMAGES

This application claims the benefit of U.S. Provisional Application 60/112,650 filed on Dec. 14, 1998.

FIELD OF THE INVENTION

The present invention relates to a method for improving the visual appearance of a digital image. In a specific embodiment, the invention relates to reducing staircasing effects as a result of electronic zooming of a low resolution image. The method is suitable for enhancing digital images obtained by an electronic camera.

BACKGROUND OF THE INVENTION

Original images are usually represented electronically by a rectangular array of picture elements or pixels, which together make up the electronic image. Each pixel represents a small rectangular portion of an original image. The length of each rectangular portion or inversely, the number of pixels per unit of length in the original image is referred to as the spatial resolution of the electronic image. The spatial resolution is expressed in pixels per millimeter. Usually the resolution is constant in each direction, such that each pixel represents a square portion. The electronic image may also have a constant maximum resolution in a first direction and a constant minimum resolution in a second direction orthogonal to the first direction. In that case, each pixel represents a non-square rectangular portion of the original image. The resolution is dictated by the size of the original image to be represented electronically and the maximum number of pixels available in a row or a column of the rectangular array for the electronic image. If the size of the original image is 1 meter and the number of pixels is 1000, then the resolution of the electronic image will be 1000 pixels per meter or 1 pixel per mm. That electronic image may be rendered on a device capable to print 10 pixels per millimeter, i.e. a device having a spatial device resolution of 10 pixels per mm. As such, the 1000 pixels of the electronic image will be rendered on 100 mm. The original image of 1 meter will thus be rendered on 1 decimeter, i.e. at a scale of 1/10. If however the original image must be rendered at a scale of 1/5, i.e. the electronic image must occupy 200 mm, then two options are available. As a first option, a device may be selected having a spatial device resolution of 5 pixels per mm. Then 1000 pixels will be rendered on 200 mm. Alternatively, as a second option, the device having a resolution of 10 pixels per mm may be used, to render a second electronic image of 2000 pixels, derived from the first electronic image having 1000 pixels. The first electronic image has a resolution of 1 pixel per mm, the second electronic image still refers to 1 meter of the original image, but represented by 2000 pixels. As such, the second electronic image has a spatial resolution of 2000 pixels per meter, i.e. 2 pixels per mm. Thus, the spatial resolution of the second electronic image is twice the resolution of the first electronic image. Several techniques are known in the art to convert a first electronic image having a first spatial resolution to a second electronic image having a second spatial resolution. Such techniques are referred to image scaling. The most common and easiest image scaling technique is referred to as pixel replication or nearest neighbour interpolation. To double the spatial resolution of a first electronic image according to pixel replication to obtain a second electronic image having a higher spatial resolution, in a first step each pixel is replicated horizontally in each one image line of the electronic image, i.e. the first pixel of the first electronic image is copied to the first and second pixels of an intermediate electronic image; the second pixel of the first electronic image is copied to the third and fourth pixels of the intermediate electronic image; etc. In a second step, each line of the intermediate electronic image is replicated vertically in the second electronic image, i.e. the first line of the intermediate electronic image is copied to the first and second lines of the second electronic image; the second line of the intermediate electronic image is copied to the third and fourth lines of the second electronic image; etc. By this scaling technique, a single black pixel on a white background in the first electronic image results in a block of 2 by 2 black pixels on a white background in the second electronic image. A black horizontal line having a width of one pixel on a white background in the first electronic image results in a black horizontal line having a width of two pixels on a white background in the second electronic image. The same applies for a vertical line. An oblique black line on a white background in the first low resolution electronic image, e.g. a line having a slope of 45° and having a width of 1 pixel in the first image, i.e. a set of single black pixels connected to each other by the upper right and the lower left corners of the pixel, will result in the second high resolution electronic image in a set of black squares of 2×2 pixels each, connected to each other by their upper right and lower left corners. This effect, which is even more conspicuous for oblique lines having slope different from 45°, is referred to as staircasing. The staircasing effect is also visible in the enlarged image where shorter oblique line segments are present in the original electronic image, or even where an abrupt transition from a white area to a black area is present and the line of transition is neither horizontal nor vertical. The above example describes a scaling factor of 2. Also other integer scaling factors such as 3, 4, etc. may be envisaged. Even non-integer scaling factors are possible, such as a factor of 1.5 where each even pixel of the first electronic image is replicated once and each odd pixel of the first electronic image is replicated twice.

By use of another scaling technique, referred to as bilinear interpolation, transitions are smoothed, in the sense that between a black and a white pixel of a transition, a grey pixel will be introduced by the interpolation technique. Also this may be an unwanted effect, since the originally sharp transitions tend to look fuzzy on the enlarged image.

A third scaling technique, referred to as cubic spline interpolation, creates the new pixels of the second high resolution electronic image by convolution of four pixels of one line in the first low resolution electronic image with a third order polynomial, which:
1. is zero outside the interval x=[−2,2],
2. takes the value y=1 in x=0,
3. takes the value y=0 in x=−2, −1, +1 and +2
4. is everywhere continuous, i.e. for x=(−∞,+∞); and,
5. has everywhere continuous first and second order derivatives.

This convolution technique applied horizontally and vertically substantially eliminates the staircasing effect and the smoothing effect on the grey values, but may introduce other artefacts known to be due to reconstruction, such as overshooting, where an abrupt transition from light grey pixels to dark grey pixels may introduce pixels having a greyness lighter than the light grey or darker than the dark grey.

Despite the above mentioned drawbacks of image scaling, this operation becomes increasingly necessary in electronic image processing applications for the following two reasons. First of all, low cost image scanners or one-shot electronic cameras may produce low resolution images. The size of the original image or scene may be fixed, e.g. 210 mm×297 mm on an A4 page to be scanned or 5 m horizontally by 3.75 m vertically of an object in the scene to be captured by an electronic camera. Also the number of pixels horizontally and vertically may be fixed, such as 1280 pixels horizontally and 960 pixels vertically as in the ePhoto 1280 (Trademark) electronic camera distributed by Bayer Corporation, Agfa division Wilmington, Mass. As such, the object of the scene will be stored in the electronic image at a resolution of 256 pixels per meter. If the user reproduces the object of the scene by printing the electronic image on a 400 dpi (15.75 pixels per mm) printer, the size of the reproduced image will be:

1280 pixels/15.75 pixels/mm=81 mm horizontally; and, 960 pixels/15.75 pixels/mm=61 mm vertically.

If the user wants the object of the scene to be reproduced on a usual size for photo prints, e.g. 10 cm×15 cm, the resolution of the captured electronic image may be doubled to obtain a second electronic image of 2560 by 1920 pixels, having a spatial resolution of 512 pixels per meter. If printed on the same 400 dpi printer, the size of the reproduction will be 12.2 cm by 16.2 cm. If a nearest neighbour interpolation technique were used to electronically increase the resolution by a factor of two, staircasing may already be visible by the naked eye. If the user wants to fill an A4 sized page (21 cm by 29.7 cm) by the reproduced scene, the captured low resolution image may be scaled by a factor of four to obtain an image of 24.4 cm by 32.4 cm, which may be cropped to the required size. In such case however, the staircasing effects are clearly visible and even objectionable. These effects are also visible on portions of an electronic image that are electronically enlarged to be viewed in more detail on the colour monitor of an interactive image processing station. In an image acquisition system, simply the number of individual photosensitive elements in a row or column are referred to as the image resolution. This stems from the fact that such number is usually fixed for a specific device, whereas the size of the scene or the original picture which is projected on such row or column may be varied by optical zooming. The ePhoto 1280 described above may thus be said to have a "resolution" of 1280. This "resolution" is imposed by the size of the two-dimensional CCD (charge coupled devices) array in the electronic camera. The question whether or not staircasing will be visible on the monitor displaying the electronic image or on the hard copy depends on the resolution of these display devices, the required size of the displayed image and the scaling required to achieve that size.

Another source of artefacts is irreversible image compression and expansion, such as JPEG. The term irreversible stands for the fact that the second electronic image obtained by expansion of a compressed version of a first electronic image is not guaranteed to be identical to the first electronic image. According to a JPEG technique, the first electronic image is partitioned in sections of 8×8 pixels. Each section is compressed to a data format that occupies less memory than the memory required to store the 8×8 or 64 pixels. The thus compressed image may be temporarily stored in a memory means or transmitted to another image processing system. Whenever the image is needed for display on a monitor or for reproduction, the compressed data format is expanded to yield sections of 8×8 pixels. Assembly of these expanded 8×8 sections gives a second electronic image, very similar to the first electronic image. According to the JPEG compression technique, a compression ratio may be specified. The higher the compression ratio, the more the second electronic image may be different from the first electronic image. This difference may be apparent in the second expanded electronic image, even without visually referring to the first original electronic image. The 8×8 sections may be identified by the naked eye. Also this effect is unwanted and may need correction.

Electronic images may already suffer from the staircasing effect, either because an electronic scaling already took place or because the electronic image has undergone a JPEG compression and expansion. Electronic scaling or zooming such image will further deteriorate the quality of the image, possibly by introducing more staircasing effects.

According to prior art methods, the user may interactively adapt the pixel values in areas where the staircasing effects are most objectionable. But this is a tedious work. There is thus a need to assist the user by electronic image processing means to remove these unwanted effects.

OBJECTS OF THE INVENTION

It is an object of the invention to provide a method for attenuating or removing the effect of staircasing when low resolution images are electronically enlarged.

It is another object of the invention to enlarge electronic images such that the image quality is comparable to an electronic image acquired at a higher resolution.

SUMMARY OF THE INVENTION

The above mentioned objects are realised by a method having the specific features defined in claim 1. Specific features for preferred embodiments of the invention are set out in the dependent claims.

The method according to the current invention proceeds in the following way. Preferably, each pixel of the electronic image is selected for examination. Preferably, this is done in an orderly way, e.g. starting from the first pixel in the first line, proceeding to the second pixel in the first line, etc. For each pixel, at least two different orientations are defined, e.g. vertical and horizontal. Preferably, four orientations are defined, including horizontal, vertical and two oblique directions at +45° and −45° with respect to the vertical direction. Also three, five, . . . directions may be defined. Each direction may be materialised by a straight line running through the selected pixel. For each direction a gradient value may be computed. In its theoretical definition, the gradient value is the amount of change of the pixel value for a unit displacement according to the chosen direction. In the detailed description various implementations will be given for the computation of the gradient value, suitable for application to a digital electronic image. Each direction may give a different gradient value. Therefore, with each direction a gradient value for the selected pixel is associated. Since with each direction a line is associated, each gradient value is also associated with a line.

According to the current invention, the gradient values according to different orientations or directions are decisive for the operations to be done on the selected pixel value. Therefore, one of the plurality of directions or defined lines is selected based on the value of the associated gradient. In one embodiment, the direction having the largest gradient value may be selected. According to another embodiment, the direction having the smallest gradient value may be selected. The orientation of the selected direction is decisive for the orientation of a second direction along which smoothing may be done. The second direction corresponds to a second line, which may be positioned to run through the selected pixel. This second direction has a specific orientation with respect to the first selected direction. In a preferred embodiment, the second line has an orientation orthogonal to the orientation of the first line having the largest gradient value. In another embodiment, the second line has an orientation parallel to the orientation of the first line having the smallest gradient value. In both cases, the second line has a specific orientation relative to the selected first line.

The values of at least two pixels situated on the second line, will be decisive for the new pixel value of the selected pixel.

According to a preferred embodiment, the gradient value may be computed based on at least two pixel values: the pixel value of a first pixel P1 and the pixel value of a second pixel P2. Both P1 and P2 are situated on the defined line, associated with the gradient value. Thus the gradient G is a function of P1 and P2, i.e. G=G (P1,P2). The function G( ) is a function having two arguments. G( ) is selected such that if the value of P1 increases, the value of G does not decrease. This means that the value of G may remain constant or increase when P1 increases. If the value of P2 increases, the value of G does not increase, i.e. G remains constant or decreases when P2 increases.

According to a specific embodiment, G=P1−P2. More generally, G=W1.P1−W2.P2. W1 and W2 are two constant positive weight factors, for multiplication with P1 and P2 respectively. The value of W1 and W2 may depend on the location of P1 and P2 relatively to the selected pixel. According to a more specific embodiment as discussed in the detailed description, G is the difference of two (weighted) sums of pixel values. The first sum includes pixels situated on a line orthogonal to the defined line. The second sum includes pixels located on a line parallel to that orthogonal line, or pixels situated on a lines parallel to the direction of the defined line and including the pixels from the first sum. A weighted sum means that each pixel value may be multiplied with a positive weight factor, before it is accumulated to the sum.

If the largest gradient value is taken to decide on the direction along which the smoothing will be performed, then it is preferred that the second line used for computation of the new pixel value is oriented substantially orthogonal with respect to the orientation associated with the largest gradient value. A second line is substantially orthogonal to a first line selected from a plurality of N lines having different orientations, if the angle between the first and second line is in the range of [90°−Δ,90°+Δ], where Δ=90°/N. If for example the gradient is examined according to four directions, then N=4. The angle between the first and second line may then be from 67.5° to 112.5° in order to be substantially orthogonal. The orthogonality must be measured on the reproduced visible image, because it is possible that the spatial resolution of the electronic image is non-isotropic, i.e. that the distance between the centres of two neighbouring pixels in the horizontal (line) direction is different from such distance in the vertical direction. Such situation is also referred to as an electronic image having rectangular pixels.

According to a preferred embodiment, the new pixel value is computed from at least two pixels situated on the second line, having the direction according to which smoothing must occur. These two pixels are referred to as third and fourth pixel P3 and P4 respectively, whereas the third or fourth pixel may well coincide with the aforementioned first or second pixel. In order to achieve a smoothing operation, it is advantageous to compute the new pixel value based on a smoothing function S=S (P3,P4). The smoothing function has the property that as one of its arguments P3 or P4 increases, the function value either remains constant or increases; i.e. S is a non-descending function of its arguments. According to one embodiment, S includes a weighted sum of P3 and P4, e.g. S (P3,P4)=W3.P3+W4.P4.

According to a more preferred embodiment, the corrected image is further processed for sharpening, also based on gradient calculations.

Further advantages and embodiments of the present invention will become apparent from the following description and drawings.

DETAILED DESCRIPTION OF THE INVENTION

Figure 1:
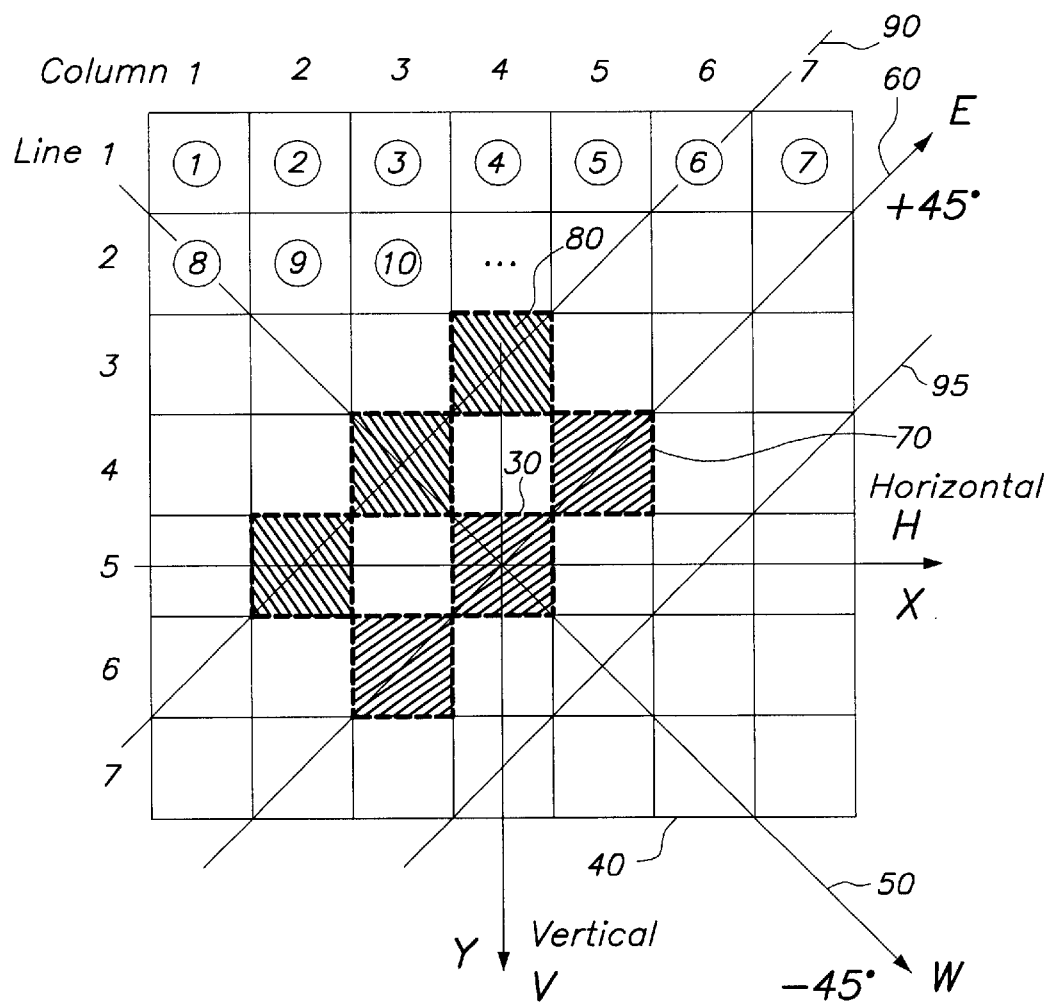
FIG. 1 shows a digital image including lines for computing gradients and the relevant pixels.

An electronic image from a scanner or an electronic camera may already show a staircasing effect. If the spatial resolution of such an image must be increased, then it is advantageous to first remove or cure the present staircasing and afterwards to zoom or electronically scale the cured electronic image. The procedures for removing the staircase effects may be implemented preferably by a plug-in in an interactive image processing application, such as Adobe PhotoShop (marketed by Adobe Inc.) or PhotoWise (developed by Sierra Inc.).

In order to remove staircasing automatically, these effects must be localised in the electronic image. It has been found that these effects are most conspicuous and must be cured in areas where transitions from light to dark or from one colour to another colour occur. To find these locations, gradients of the pixel values are computed. The gradient is generally defined as a change in the value of the pixel per unit distance in a specified direction. In an electronic image, two orthogonal directions may be defined, i.e. the X-direction parallel to the rows of the electronic image and the Y-direction parallel to the columns of the electronic image. The gradient in the X-direction may be computed by taking the difference of the values of two horizontally adjacent pixels. The gradient in the Y-direction may be computed by taking the difference of the values of two vertically adjacent pixels. The gradient in an oblique direction of 45° with respect to the X-direction may be computed by taking the difference of the values of two pixels touching each other by one corner point. To correct for the distance between the centres of two such pixels, the difference may be divided by a factor of $\vec{\sqrt{2}}$. Gradients in other directions may be defined accordingly. In a preferred embodiment, the gradient is defined by taking into account more than two pixel values. This may be done by defining a gradient operator, which is characterised by a kernel, in the form of a matrix, i.e. a two-dimensional array. The kernel may have a size of (2N+1)×(2N+1) elements, with N>0. As such, the kernel may have a size of 3×3, 5×5, 7×7 etc. It has been found that a trade-off exists for the size of the kernel. A 3×3 kernel is advantageous for the image processing speed, but edges may be missed if the electronic image were previously scaled with a large scaling factor by a bilinear interpolation technique. As the size of the kernel increases, the degree of freedom to chose the values for the kernel elements increases dramatically. Also the accuracy by which a direction of the gradient may be specified increases.

But at the same time, the number of elements of the kernel increases quadratic, and the image processing time increases accordingly.

Kernels having a size of (2N+1)×(2N+1) have a central element, which is referred to as $K_{0,0}$. The other elements of the kernel are referred to as $K_{I,J}$, with $-N \leq I, J \leq +N$. Each element of the kernel has a specific value. These element values may be chosen such that convolution of the kernel with a portion of the electronic image according to the equation below gives a measure of the gradient according to a specific direction. As such, each specific kernel $K_{I,J}$ corresponds to a specific direction. A set of kernels $K^D$ each for a direction D may be specified. To compute a gradient $S^D(x,y)$ based on kernel $K^D$ with kernel elements $K^D_{I,J}$ at a location (x,y) in the electronic image, the following algebraic sum $S^D(x,y)$ is computed:

$$S^D(x, y) = \sum_{J=-N}^{N} \sum_{I=-N}^{N} K^D_{I,J} \times P_{x+I, y+J} \quad (1)$$

The sum S in the above equation, i.e. the gradient, may be positive or negative. If the absolute value of S is large, then the gradient in (x,y) according to the direction D associated with the kernel $K^D_{I,J}$ is high. In a black horizontal line on a white background, the gradient according to a horizontal direction will have a small absolute value or have the value zero; the gradient according to a vertical direction will have a large absolute value; the gradient according to any other oblique direction will have preferably an absolute value between said small and large absolute value. Such gradient value clearly depends on the values chosen for the elements $K^D_{I,J}$. Suitable 3×3 kernels are given below:

$$K^H = \begin{bmatrix} -1 & 0 & +1 \\ -1 & 0 & +1 \\ -1 & 0 & +1 \end{bmatrix} \quad K^V = \begin{bmatrix} -1 & -1 & -1 \\ 0 & 0 & 0 \\ +1 & +1 & +1 \end{bmatrix} \quad K^1 = \begin{bmatrix} 0 & +1 & +1 \\ -1 & 0 & +1 \\ -1 & -1 & 0 \end{bmatrix} \quad K^2 = \begin{bmatrix} +1 & +1 & 0 \\ +1 & 0 & -1 \\ 0 & -1 & -1 \end{bmatrix}$$

The kernel $K^H$ is suitable to detect horizontal gradients, i.e. variations of values of pixels that are horizontally adjacent. A horizontal gradient will be zero for a horizontal black line on a white background but will be maximal for a such vertical line. The kernel $K^V$ will be suitable to detect a vertical gradient, e.g. a horizontal line. The kernel $K^1$ is suitable to detect a gradient in a direction according to the first diagonal, i.e. from upper left to lower right. A black line on a white background running from lower left to upper right has such a gradient. The kernel $K^2$ is suitable to detect a gradient in a direction according to the second diagonal. It is clear that a gradient computed according to the above kernels and the above equation (1) gives the amplitude of the gradient and the sense, i.e. a vertical edge having low pixel values at the left and high at the right will give a positive value for the gradient $S^H(x,y)$, whereas a horizontal edge having high pixel values at the left and low at the right will give a negative value for the gradient. For the purpose of the current invention, it is more important to know the amplitude of the gradient, rather than its sense. Therefore, in a preferred embodiment, the absolute value of $S^D(x,y)$ is taken and further referred to as 'gradient' $|S^D(x,y)|$. Such a gradient having a low value, i.e. close to zero, is an indication that according to the corresponding direction no large variations of pixel values are present. If the value of such gradient is high, then an abrupt transition according to that direction is present in the image. In a more preferred embodiment, the 'gradient' is defined as the sum $|S^{D1}(x,y)|+|S^{D2}(x,y)|$ of two such positive gradients $|S^D_1(x,y)|$ and $|S^D_2(x,y)|$. Examples are given below.

According to the invention, the gradient at a specific location (x,y) in the electronic image is computed according to at least two different directions $D_1$ and $D_2$, giving corresponding gradient values $S^1$ and $S^2$. The maximum value of these gradients is selected and the corresponding direction is assumed to be the direction D in which the gradient at location (x,y) is maximal. According to one embodiment of the invention, the pixel values of the electronic image are subsequently smoothed in a direction orthogonal to the direction having the maximum gradient. Thus essentially, as shown in FIG. 1, this method according to the current invention involves the following steps:

1. identifying a specific pixel location 30 in the electronic image 40
2. finding a first direction W having the maximum gradient at the identified pixel location
3. smoothing the image in the neighbourhood of the identified pixel location 30 in a second direction E substantially orthogonal to the first direction W.

In principle, a plurality of gradients may be determined for each pixel of the electronic image. Then a smoothing operation is done in the direction perpendicular to the largest gradient.

According to a preferred embodiment, for each pixel a gradient is computed according to four directions referred to as V, H, E and W. The four gradients according to these four directions V, H, E and W are referred to as:

1. gradV for a vertical direction, i.e. North to South
2. gradH for a horizontal direction, i.e. East to West
3. gradE for a first diagonal direction, i.e. Northeast to Southwest
4. gradW for a second diagonal direction, i.e. Northwest to Southeast In one embodiment of the current invention, these gradients are defined as follows:

$$gradV = (|S^V_1(x,y)| + |S^V_2(x,y)|)$$

$$gradH = (|S^H_1(x,y)| + |S^H_2(x,y)|)$$

$$gradE = (|S^E_1(x,y)| + |S^E_2(x,y)|)$$

$$gradW = (|S^W_1(x,y)| + |S^W_2(x,y)|)$$

The corresponding kernels according the definition of equation (1) are defined as follows:

$$K^V_1 = \begin{bmatrix} 0 & 1 & 1 & 1 & 0 \\ 0 & 0 & 0 & 0 & 0 \\ 0 & -1 & -1 & -1 & 0 \\ 0 & 0 & 0 & 0 & 0 \\ 0 & 0 & 0 & 0 & 0 \end{bmatrix} \quad K^V_2 = \begin{bmatrix} 0 & 0 & 0 & 0 & 0 \\ 0 & 0 & 0 & 0 & 0 \\ 0 & 1 & 1 & 1 & 0 \\ 0 & 0 & 0 & 0 & 0 \\ 0 & -1 & -1 & -1 & 0 \end{bmatrix}$$

-continued $$K_1^H = \begin{bmatrix} 0 & 0 & 0 & 0 & 0 \\ 1 & 0 & -1 & 0 & 0 \\ 1 & 0 & -1 & 0 & 0 \\ 1 & 0 & -1 & 0 & 0 \\ 0 & 0 & 0 & 0 & 0 \end{bmatrix} \quad K_2^H = \begin{bmatrix} 0 & 0 & 0 & 0 & 0 \\ 0 & 0 & 1 & 0 & -1 \\ 0 & 0 & 1 & 0 & -1 \\ 0 & 0 & 1 & 0 & -1 \\ 0 & 0 & 0 & 0 & 0 \end{bmatrix}$$

$$K_1^W = \begin{bmatrix} 0 & 0 & 1 & 0 & 0 \\ 0 & 1 & 0 & -1 & 0 \\ 1 & 0 & -1 & 0 & 0 \\ 0 & -1 & 0 & 0 & 0 \\ 0 & 0 & 0 & 0 & 0 \end{bmatrix} \quad K_2^W = \begin{bmatrix} 0 & 0 & 0 & 0 & 0 \\ 0 & 0 & 0 & 1 & 0 \\ 0 & 0 & 1 & 0 & -1 \\ 0 & 1 & 0 & -1 & 0 \\ 0 & 0 & -1 & 0 & 0 \end{bmatrix}$$

$$K_1^E = \begin{bmatrix} 0 & 0 & 1 & 0 & 0 \\ 0 & -1 & 0 & 1 & 0 \\ 0 & 0 & -1 & 0 & 1 \\ 0 & 0 & 0 & -1 & 0 \\ 0 & 0 & 0 & 0 & 0 \end{bmatrix} \quad K_2^E = \begin{bmatrix} 0 & 0 & 0 & 0 & 0 \\ 0 & 1 & 0 & 0 & 0 \\ -1 & 0 & 1 & 0 & 0 \\ 0 & -1 & 0 & 1 & 0 \\ 0 & 0 & -1 & 0 & 0 \end{bmatrix}$$

From the above equations and two-dimensional arrays showing the kernels it follows that the computations shown below are performed, assuming that the pixels $P_{I,J}$ of the image are labelled as follows, where $P_{0,0}=p(x,y)$ is the current central pixel:

$$\begin{bmatrix} P_{-2,-2} & P_{-2,-1} & P_{-2,0} & P_{-2,+1} & P_{-2,+2} \\ P_{-1,-2} & P_{-1,-1} & P_{-1,0} & P_{-1,+1} & P_{-1,+2} \\ P_{0,-2} & P_{0,-1} & P_{0,0} & P_{0,+1} & P_{0,+2} \\ P_{+1,-2} & P_{+1,-1} & P_{+1,0} & P_{+1,+1} & P_{+1,+2} \\ P_{+2,-2} & P_{+2,-1} & P_{+2,0} & P_{+2,+1} & P_{+2,+2} \end{bmatrix}$$

$S^V_1 = P_{-2,-1}+P_{-2,0}+P_{-2,1}-P_{0,-1}-P_{0,0}-P_{0,1}$ $S^V_2 = P_{0,-1}+P_{0,0}+P_{0,1}-P_{2,-1}-P_{2,0}-P_{2,1}$ $\text{gradV}=(\text{abs}(S^V_1)+\text{abs}(S^V_2))$ $S^H_1 = P_{-1,-2}+P_{0,-2}+P_{1,-2}-P_{-1,0}-P_{0,0}-P_{1,0}$ $S^H_2 = P_{-1,0}+P_{0,0}+P_{1,0}-P_{-1,2}-P_{0,2}-P_{1,2}$ $\text{gradH}=(\text{abs}(S^H_1)+\text{abs}(S^H_2))$ $S^W_1 = P_{-2,0}+P_{-1,-1}+P_{0,-2}-P_{-1,1}-P_{0,0}-P_{1,-1}$ $S^W_2 = P_{-1,1}+P_{0,0} + P_{1,-1}-P_{0,2}-P_{1,1}-P_{2,0}$ $\text{gradW}=(\text{abs}(S^W_1)+\text{abs}(S^W_2))$ $S^E_1 = P_{-2,0}+P_{-1,1}+P_{0,2}-P_{-1,-1}-P_{0,0}-P_{1,1}$ $S^E_2 = P_{-1,-1}+P_{0,0}+P_{1,1}-P_{0,-2}-P_{1,-1}-P_{2,0}$ $\text{gradE}=(\text{abs}(S^E_1)+\text{abs}(S^E_2))$ From the above equations and matrices it is clear that the gradient is based on a difference between two groups 70, 80 of pixels. The first group 70 is situated on a first straight line 60 and the second group 80 situated on a second line 90 parallel to the first line 60. The first line 60 according to the first group 70 includes the centre pixel $p_{0,0}$ 30 and has a specific orientation orthogonal to the direction of the gradient V, H, W or E. The second line 90 according to the second group of pixels 80 is parallel to and spaced apart from the first line 60 such that one line of pixels is in between the first and second line. This arrangement has proven to be advantageous to cope with noise in the image. Moreover, the gradient is not computed based on $p_{0,0}$ alone, but based on the sum of three pixel values situated on the first line, including $p_{0,0}$. This corresponds to a kind of mean value of pixel values in the neighbourhood of $p_{0,0}$. Also for the second line three pixel values are taken into account and added as a sum for diminishing the influence of noise. Finally, the difference of the sum according to the first line 60 and the sum according to the second line 90 is computed to get a first gradient value. The absolute value of this difference is used for further computations. A similar absolute value of difference is computed for the first line 60 and a third line 95, the third line 95 being parallel to the first line 60 and situated opposite to the position of the second line 90 with respect to the first line 60. The spacing apart between the first 60 and second 90 line and between the first 60 and third line 95 is also shown in the kernel matrices shown above. A line having values 0 is situated between a line having values −1 and a line having values +1. By this choice of the computation of the gradient, the global behaviour of the image data is assessed. The risk of taking the wrong decision about the direction to be smoothed in regions having high frequency components is seriously reduced.

The gradient gradMAX having the maximum value of the four gradients gradV, gradH, gradW and gradE is searched. If this maximum gradient is gradV, then the neighbourhood of P(x,y) is smoothed in a horizontal smoothing direction. This smoothing operation is preferably done according to the following assignment statement, which gives a new value for the current centre pixel $P_0$ as a weighted mean value of the old pixel value and the two neighbouring pixel values $P_{-1}$ and $P_{+1}$ situated on a line in the smoothing direction.

$$P_0 = [P_{-1} + P_0 + P_0 + P_{+1}]/4$$

According to the above example, where the maximum gradient is gradV, the new value for the current pixel $p(x,y) = P_{0,0}$ is:

$$P_{0,0} = [P_{0,-1} + P_{0,0} + P_{0,0} + P_{0,+1}]/4$$

From the above equation, it is clear that the new pixel value is computed as a weighted sum of values of pixels, situated on a horizontal line. The pixels involved are $P_{0,-1}$, $P_{0,0}$ and $P_{0,+1}$. The weights are ¼, ½ and ¼ respectively.

Preferably the smoothing operation and the computation of the gradients is done on non-corrected, i.e. non-smoothed image pixels. In a preferred embodiment, the picture is scanned line-wise, the first pixel being located on the top left hand corner; scanning the first line to the last pixel on the top right hand corner; then scanning the second line from left to right etc. Preferably for each pixel of the image—or those pixels being located at least three pixels from the border lines of the image—the gradients gradV, gradH, gradW and gradE are computed. In order to cope with the kernels having an extent of 5×5, five lines of the original image are kept in a buffer memory, such that the computations within the 5×5 kernel around the centre pixel may be done completely in the buffer memory, and the smoothed pixels may overwrite the original image. Processing an image having 1024 lines and 1024 pixels per line takes about five to ten seconds on a 350 MHz processor.

Even if the maximum gradient value is relatively small, then it is still advantageous to perform the smoothing operation. If the maximum gradient value is small, then all gradient values according to different directions in the same image pixel are small. This means that the e.g. 5×5 region around that image pixel is a low contrast region. Experience has shown that artificial lines, caused by JPEG expansion, have a low contrast and are very conspicuous in low contrast regions. Therefore, the method according to the current invention can also cope with these JPEG problems, by smoothing pixels located in low contrast regions. Also other low contrast detail artefacts may be cured by the method according to the current invention. If low contrast artefacts are known to be absent in the image, e.g. because no JPEG compression or JPEG compression with a low compression ratio has been performed, then low contrast smoothing may be excluded by setting a lower threshold value for the maximum gradient value. If the gradient value is lower than the maximum threshold value, then no smoothing is done. A typical lower threshold value for smoothing ranges between 5 or 7 for images having a bit depth of 8, i.e. where maximally 256 levels are available for representing the grey value of a pixel.

If the maximum gradient has a large value, then it is almost sure that a steep edge is present at the centre pixel in the image. In such case it is advantageous to smooth the edge in a direction substantially orthogonal to the direction having the maximum gradient.

If the largest gradient has a value equal to or close to another gradient value of the centre pixel, it is advantageous to smooth the value of the centre pixel according to two directions; the first direction being orthogonal to the direction of the largest gradient and the second direction being orthogonal to the direction of the other gradient, which value is equal to or just lower than the largest gradient value. A smoothing factor may be selected to be proportional to the gradient value or may be equal for both directions. The smoothing factor may be incorporated in the weight values.

In another preferred embodiment, a smoothing operation is performed in more than one direction. The smoothing factor applied in each different direction may be chosen to be dependent on the value of the gradient in a direction orthogonal to that direction. If two gradients grad1, grad2 in one point but in a different direction have a value close to each other, i.e. |grad1−grad2|<T, wherein T is a relatively small positive threshold value (e.g. T=10% of grad1), then it is advantageous to smooth in a direction orthogonal to grad1 and in a direction orthogonal to grad2. In one embodiment, the smoothing factors S1 and S2 used for smoothing in these directions may be equal to each other. In another embodiment, the smoothing factors S1 and S2 may depend on or be proportional to the corresponding gradient values grad1 and grad2 respectively. According to another embodiment, a smoothing operation may be performed in each direction, each being orthogonal to a direction according to which a gradient has been computed. The smoothing factor used according to a direction D, may be chosen to be inversely proportional to the corresponding gradient, according to a direction orthogonal to D.

In smooth homogeneous regions of the electronic image, i.e. regions where the pixel values are substantially equal to each other, the gradients in all directions will have a low value. These regions seem to require no image processing. However, such regions may be prone to visible noise or JPEG lines. Noise may originate from the image acquisition system which generates for substantially the same exposure levels of the photosensitive elements, slightly different pixel values. These different pixel values may become visible in the otherwise smooth areas of the displayed electronic image. JPEG lines may be introduced by lossy JPEG compression and expansion. The human eye is especially sensitive to small intensity variations, occurring in closely related points, in large areas having a substantially constant intensity. Therefore, in a preferred embodiment, the gradient is computed in such areas according to a plurality of directions. For each pixel, a plurality of gradients is computed. The maximum value of such gradients for that pixel is established. If that maximum value is lower than a specific threshold value, then the that pixel may be located in a smooth area. Such area in the neighbourhood of that pixel may then be smoothed in all directions or just in a vertical and/or horizontal direction. This operation has shown to be very effective to attenuate the artefacts introduced by JPEG compression and subsequent expansion.

If the gradient values for the three directions E, H and W are close to each other and at least one of these gradient values is the maximum gradient value and no gradients are examined in directions between E, H and W, then the smoothing may be done in a direction orthogonal to the mean of the directions E, H and W or orthogonal to the direction that is situated between the two other directions. According to the above conventions, H is situated between E and W. Accordingly, the smoothing may be done in a vertical direction V.

According to another embodiment of the invention, the smoothing operation in a centre pixel may be done in a direction parallel to the direction having the lowest gradient value in that centre pixel. Various tests have shown that smoothing in a direction orthogonal to the direction of the maximum gradient is more reliable in noisy images, but the technique of the lowest gradient may be used to decide on ties where the maximum gradient method is not stable.

Up to now, abstraction has been made from the type of electronic images to be smoothed. In fact, one matrix of pixel values ranging from 0 to 255 may represent a black and white image. Three such matrices may represent a colour image. The first matrix may represent the red component (R), the second matrix the green component (G) and the third matrix the blue component (B). Such system is referred to as RGB. Alternatively, the first, second and third matrix may represent luminance (L), hue (H) and saturation (S), referred to as LHS. Various other representations of electronic colour images are possible as known in the art. In an RGB system, it may be sufficient to perform the smoothing operation on the green component (G) only, since the green channel is closely related to the luminance of the image and smoothing the luminance improves the appearance of the image. Various tests have shown that smoothing the red component only is less effective than smoothing the green channel. In another embodiment, the three components R, G and B may be smoothed separately, independently from each other. This results in higher quality images, but requires also three times more processing power. In an LHS system, it may be sufficient to compute gradients only in the L image matrix. Smoothing may be done in the L matrix alone or in the L, H and S image matrices, based on the L gradients.

In a preferred embodiment, as an additional step one-dimensional sharpening may be done in the direction of the largest gradient. This operation is advantageous since the overall sharpness of the image is so increased. Prior art sharpening methods require a two-dimensional sharpening filter, which requires intensive processing. Preferably, the sharpening step is performed after the smoothing step. As such, in a first step the smoothing operation based on gradients may be performed on the complete image, whereas in a subsequent step sharpening based on (other) gradients is performed on all the pixels of the image. The second gradients used in the second sharpening step may be different from the first gradients used in the first smoothing step, since the second gradients are computed from a corrected image, i.e. smoothed by the first step. For performance reasons, the sharpening operation may be combined with the smoothing operation, making use of the gradient values computed once from the original electronic image. The results of this combined operation may be different from the results obtained by the two step method, but the results may still be acceptable. Alternatively, the gradients for the smoothing operation may be computed on the non-corrected pixel values and the value of the centre pixel is corrected, i.e. smoothed. Then, the gradients for the sharpening operation are computed based on the corrected pixel values, the sharpening operation is performed on the corrected pixel values, and the thus corrected and sharpened pixel values are stored in image memory. Alternatively, the gradients for the sharpening operation are based on the original non-corrected pixel values. In such case, the gradients computed for the smoothing operation may be re-used for the sharpening operation. In a preferred embodiment, the computed gradients for the two previous lines are stored. Upon computation, these gradients are used for the smoothing operation and once the next two lines are smoothed, these gradients are used to decide on the sharpening of the smoothed pixels, making use of smoothed pixels for the computation of the sharpened pixel value.

The sharpening is preferably done by the following equation:

$$P_0 = P_0 + S*[P_0 - (P_{-1} + P_0 + P_1)/3]$$

In the above assignment statement, S is a strength parameter and * represents the multiplication operator. The value of S may be in the range of 1 to 10. $P_{-1}$ and $P_1$ are the respective values of the is previous and next pixel relative to the centre pixel $P_0$ on a line in the sharpening direction. The sharpening direction is preferably substantially parallel to the direction having the maximum gradient value. That direction may be determined by the method described above for the smoothing operations. Analysis of the above equation teaches that the new value for $p_0$ is a weighted algebraic sum of $p_0$, $p_{-1}$ and $p_1$:

$$p_{new} = W_0 \cdot P_0 - W_1 \cdot P_1 - W_{-1} \cdot P_{-1}$$

with: $W_0 = 1 + 2S/3$ $W_1 = W_{-1} = S/3$

According to the above example, where the maximum gradient is gradV, the new value for the current pixel $p(x,y) = P_{0,0}$ is:

$$P_{0,0} = P_{0,0} + S*[P_{0,0} - (P_{0,-1} + P_{0,0} + P_{0,+1})/3]$$

As such, the more the central pixel has a value being different from the mean value of its two neighbouring pixels, the more the value of the central pixel will be changed. According to other embodiments, the difference of two or more weighted pixel values may be taken into account to compute the sharpened pixel value. The above described sharpening operation on the pixels of an electronic image may considerably increase the quality of the reproduction based on such electronic image.

What is claimed is:

1. A method for enhancing pixel values of an electronic image comprising the steps of:

selecting a pixel of the electronic image;

defining a plurality of lines running through said selected pixel, each line having a specific orientation, said orientation being different from the orientation of each other defined line;

computing for each defined line an associated gradient value;

selecting a first line from said plurality of lines, said selection being based on the value of said associated gradient value;

establishing a second line, running through said selected pixel and having a specific orientation relative to the orientation of said selected first line; and, replacing a value of said selected pixel by a new pixel value, said new pixel value being based on values of at least two pixels, both pixels being situated on said second line.

2. The method according to claim 1, wherein said associated gradient value associated to said defined line is a function of a value of a first pixel on said line and a value of a second pixel on said line, wherein:

said function is non-descending with respect to said value of the first pixel; and, said function is non-ascending with respect to said value of the second pixel.

3. The method according to claim 2, wherein said associated gradient value includes a difference of weighted values of said first and second pixels.

4. The method according to claim 1, wherein:

said first line has an associated gradient value being larger than the value of any other computed gradient in said selected pixel; and, said second line has an orientation substantially orthogonal to said orientation of said selected first line.

5. The method according to claim 1, wherein:

said second line comprises a third and a fourth pixel; and, said new pixel value is a non-descending function of a value of said third pixel and a value of said fourth pixel.

6. The method according to claim 5, wherein said new pixel value includes a sum of weighted values of said third and fourth pixels.

7. The method according to claim 1, comprising the step of replacing the value of said selected pixel by a new pixel value, said new pixel value being based on values of at least two pixels, both pixels being situated on a line having a maximum associated gradient.

* * * * *